2,901,365
Patented Aug. 25, 1959

2,901,365

GLASS COMPOSITION

Samuel L. Seymour, Oakmont, and James E. Duncan, Brackenridge, Pa., assignors to Pittsburgh Plate Glass Company, Allegheny County, Pa., a corporation of Pennsylvania No Drawing. Application November 25, 1957
Serial No. 698,328

6 Claims. (Cl. 106—52)

The present invention relates to a family of glass compositions having a density below 2.7 grams per cubic centimeter, preferably between 2.55 and 2.65 grams per cubic centimeter and having a refractive index, $N_d$, of 1.56 to 1.58. Such glasses are desired so that higher magnifications can be obtained in lenses with less glass weight.

Presently made ophthalmic glasses having a relatively high refractive index require the addition of oxides of relatively high densities, such as PbO and BaO to obtain this desired property. The inclusion of such heavy oxides has resulted heretofore in the necessity for increasing the density of lenses provided with a high refractive index to above 3 grams per cubic centimeter. This additional weight is a source of considerable annoyance to wearers of spectacles containing such heavy lenses, especially those people requiring thick lenses. When low refractive index glasses are used for ophthalmic purposes, lenses of considerable thickness are required to supply the needed magnification. High index glasses required for equivalent magnifications are thinner and more desirable for style considerations.

Accordingly, it is an object of the present invention to provide ophthalmic glasses having lighter weight and a relatively higher index of refraction than has hitherto been available for ophthalmic lenses.

Another object of this invention is to provide ophthalmic glasses for lenses which will give greater comfort to the wearer of spectacles where high magnification is a requirement. It is also an object of this invention to provide ophthalmic glasses which will permit the use of thin lenses for high magnification and thus improve the appearance of spectacles.

A further object of the present invention is to provide a crown type ophthalmic glass for use as the sole portion of spectacle lenses having an index of refraction, $N_d$, between about 1.56 and 1.58 and a density of not more than 2.7 grams per cubic centimeter, preferably between 2.55 and 2.65 grams per cubic centimeter.

It has been found that the objects of the present invention can be obtained by utilizing glasses having compositions within the ranges set forth below. Table I discloses ranges of proportions of various ingredients that are suitable for providing glasses having the desired characteristics.

Table I

| Composition | Range, Percent by Weight |
|---|---|
| $SiO_2$ | 58 to 64. |
| Total alkali metal oxide | 12.5 to 17.5. |
| $Na_2O$ | 0 to 17.5. |
| $K_2O$ | 0 to 15.5. |
| $Li_2O$ | 0 to 5. |
| CaO | 7.5 to 14. |
| $TiO_2$ | 5 to 9. |

The glasses of the invention may be produced from conventional glass making batch ingredients. These batch materials include sand, soda ash, potassium carbonate, lithium carbonate, calcium carbonate, magnesium carbonate, titanium dioxide, boric acid, aluminum hydrate, antimony oxide and arsenious oxide. The batch ingredients are thoroughly mixed together and may be heated under oxidizing conditions in a refractory pot in a furnace by the controlled combustion of natural gas. Various size pots may be employed and the melting temperatures and times will vary according to the amount of glass being formed.

The following temperatures and melting conditions may be employed to melt ten pounds of the glasses of the present invention in a small pot. The empty pot is preheated in a furnace at a temperature of 2200° F. A portion of the thoroughly mixed batch is ladled into the preheated pot and the temperature of the furnace gradually increased. Over a period of 2¼ hours the remaining portion of the mixed batch is ladled into the pot and the temperature is increased to about 2650° F. to melt all materials. The furnace temperature is maintained at about 2650° F. for an additional 1½ hours to permit refining of the glass.

After the glass is refined, the temperature of the furnace is reduced slowly over a 1½ hour period to about 2100° F. The pot is removed from the furnace and the glass is poured on a metal table and rolled with a heavy roller into the form of a sheet. The sheet is placed in a kiln and cooled from about 1050° F. to about 850° F. at a rate of 3° F. per minute. Thereafter, it is cooled more rapidly to room temperature and subsequently cut into small pieces suitable for fabrication into lenses. It is to be understood that smaller or larger pots may be employed to form smaller or larger quantities of the glasses. In these cases, slightly different temperatures and time intervals may be employed, for example, the length of time of melting will be longer as larger pots are employed to melt larger quantities of the glasses.

The combined function of the various constituents in these glasses is to contribute the lowest possible density and the highest possible refractive index to the glasses. A brief description of the contribution of each ingredient to the glasses is now presented.

$SiO_2$ is the principal glass former. Since it contributes to low density, but not to a high index of refraction, the amount used must be governed by these contributions. If more than 64 percent by weight of $SiO_2$ is present, it becomes difficult to adjust the proportion of the other ingredients to provide an easily meltable glass having the desired density and refractive index. Similarly, it is difficult to obtain the desired density in a chemically durable glass having a refractive index over 1.56 when the $SiO_2$ content is reduced to below 58 percent by weight of the glass.

The alkali metal oxides are included as fluxes to assist in the melting of the batch ingredients used to form the glasses. Less than 12.5 percent by weight of alkali metal oxides results in a batch difficult to melt; whereas, more than 17.5 percent by weight results in glasses which are chemically less durable. $Na_2O$ is most desirable as the alkali metal oxide because it contributes less weight than $K_2O$; however, $K_2O$ in an amount up to 15.5 percent by weight may be employed. $Li_2O$ is a desirable constituent but is more expensive than $Na_2O$ or $K_2O$. It contributes to low weight and a high index of refraction and also improves the batch meltability.

Calcium oxide is a flux and contributes to the chemical durability of the glasses. Since calcium oxide imparts a higher refractive index to the glass than magnesium oxide, its use is preferred even though the latter contributes to a slightly lighter glass than the CaO and small amounts may be present. The range of CaO or CaO plus MgO should be about 7.5 to 14 percent.

In the glasses of our invention, $TiO_2$ is the principal constituent contributing low density and high refractive index characteristics to the glasses. Less than 5 percent by weight $TiO_2$ does not provide sufficient effect in modifying both the density and refractive index to the desired amount; whereas, over 9 percent by weight of $TiO_2$ tends to impart an objectionable yellowish color to the glasses.

It is also possible to include $B_2O_3$ in amounts up to 10 percent by weight. Greater amounts of $B_2O_3$ are not desired because it harmfully reduces the chemical durability of the glasses. Boric oxide imparts low density. It contributes a higher refractive index to the glasses when substituted for $SiO_2$. It is therefore desirable in small amounts for these reasons.

Similarly, small amounts of $Al_2O_3$ may also be included in the glasses since this ingredient has a mildly beneficial effect on both the density and refractive index as desired by the objects of the present invention. Up to 3 percent by weight of $Al_2O_3$ may be included. If more than 3 percent of $Al_2O_3$ is included, however, it is more difficult to melt the batch. It is preferred to omit this constituent ordinarily because the other ingredients recited above have a greater beneficial effect on the desired characteristics without introducing the melting problems to the degree found with alumina.

In preparing the glasses of the present invention, up to 2 percent by weight of a refining agent such as $Sb_2O_5$ or $As_2O_5$ or combinations thereof may be added to improve the refining of the glasses.

The combination of $TiO_2$ with CaO in an alkali silica glass provides a family of novel glasses suitable for ophthalmic purposes wherein a high refractive index and a low density are desired. These characteristics may be lost in part or completely when the various constituents are not properly balanced within the framework of the preferred compositions recited. A number of glass compositions which are exemplary of the invention are listed in Table II.

*Table II*

| Constituent | Parts By Weight | | | | |
|---|---|---|---|---|---|
| | No. 1 | No. 2 | No. 3 | No. 4 | No. 5 |
| $SiO_2$ | 63.6 | 61.6 | 59.6 | 58.6 | 59.6 |
| $Na_2O$ | 12.0 | 8.9 | 6.4 | 5.9 | 6.4 |
| $K_2O$ | 3.0 | 6.7 | 6.7 | 6.7 | 6.7 |
| CaO | 12.5 | 12.6 | 7.6 | 12.6 | 7.6 |
| $TiO_2$ | 8.2 | 5.5 | 9.0 | 5.5 | 9.0 |
| $B_2O_3$ | | 4.0 | 10.0 | 10.0 | 8.0 |
| $Al_2O_3$ | | | | | 2.0 |
| $Sb_2O_5$ | .7 | .7 | .7 | .7 | .7 |
| $N_d$ | 1.5708 | 1.5600 | 1.5725 | 1.5648 | 1.5705 |
| $N_u$ | 48.4 | 52.0 | 50.3 | 53.2 | 49.7 |
| Softening point, °F | 1,336 | 1,316 | 1,325 | 1,335 | 1,360 |
| Density, grams per cubic centimeter | 2.64 | 2.62 | 2.60 | 2.62 | 2.63 |

It is understood that the specific examples recited above are by way of illustration and not limitation. The breadth of the present invention is limited by the scope of the accompanying claims. The use of the terminology "consisting essentially of" in the claims is not intended to exclude the addition of small amounts of other glass forming ingredients which do not adversely effect the density, refractive index and other optical properties desired. In this regard, small amounts of colorants or other materials which may effect the transmission, absorption or other properties of the glass may be present. The glasses are useful as lenses in ophthalmic spectacles. As such, they are ground and polished according to prescription by conventional lens grinding and polishing techniques and fitted into spectacle frames.

This application is a continuation-in-part of our copending application Serial No. 410,414, filed February 15, 1954, now abandoned.

We claim:

1. A glass having a density of 2.55 to 2.65 grams per cubic centimeter and a refractive index, $N_d$, of 1.56 to 1.58 consisting essentially of the following ingredients in percent by weight: 58 to 64 percent $SiO_2$, 0 to 17.5 percent $Na_2O$, 0 to 15.5 percent $K_2O$, 0 to 5 percent $Li_2O$, the sum total of alkali metal oxides being 12.5 to 17.5 percent, 7.5 to 14 percent of alkali earth metal oxides selected from the group consisting of CaO and CaO plus MgO, 5 to 9 percent $TiO_2$, 0 to 10 percent $B_2O_3$ and 0 to 3 percent $Al_2O_3$, the above listed essential ingredients plus small amounts of colorants constituting 100 percent by weight of the glass.

2. A glass having the following approximate compositions in percent by weight: 63.6 percent $SiO_2$, 12 percent $Na_2O$, 3 percent $K_2O$, 12.5 percent CaO, 8.2 percent $TiO_2$ and 0.7 percent $Sb_2O_5$.

3. A glass having the following approximate compositions in percent by weight: 61.6 percent $SiO_2$, 8.9 percent $Na_2O$, 6.7 percent $K_2O$, 12.6 percent CaO, 5.5 percent $TiO_2$, 4.0 percent $B_2O_3$ and 0.7 percent $Sb_2O_5$.

4. A glass having the following approximate compositions in percent by weight: 59.6 percent $SiO_2$, 6.4 percent $Na_2O$, 6.7 percent $K_2O$, 7.6 percent CaO, 9.0 percent $TiO_2$, 10.0 percent $B_2O_3$ and 0.7 percent $Sb_2O_5$.

5. A glass having the following approximate compositions in percent by weight: 58.6 percent $SiO_2$, 5.9 percent $Na_2O$, 6.7 percent $K_2O$, 12.6 percent CaO, 5.5 percent $TiO_2$, 10.0 percent $B_2O_3$ and 0.7 percent $Sb_2O_5$.

6. A glass having the following approximate compositions in percent by weight: 59.6 percent $SiO_2$, 6.4 percent $Na_2O$, 6.7 percent $K_2O$, 7.6 percent CaO, 9.0 percent $TiO_2$, 8.0 percent $B_2O_3$, 2.0 percent $Al_2O_3$, and .7 percent $Sb_2O_5$.

References Cited in the file of this patent

UNITED STATES PATENTS

Re. 23,049     Armistead     Nov. 23, 1948
2,664,359     Dingledy     Dec. 29, 1953

UNITED STATES PATENT OFFICE
CERTIFICATE OF CORRECTION

Patent No. 2,901,365                                            August 25, 1959

Samuel L. Seymour et al.

It is hereby certified that error appears in the printed specification of the above numbered patent requiring correction and that the said Letters Patent should read as corrected below.

Column 4, line 26, for "alkali" read -- alkaline --.

Signed and sealed this 14th day of June 1960.

(SEAL)
Attest:

KARL H. AXLINE                                         ROBERT C. WATSON
Attesting Officer                                    Commissioner of Patents